March 5, 1957     J. A. FISHER     2,783,656

BALL DEFLECTOR FOR BALL SCREWS

Filed Dec. 19, 1955

INVENTOR.
JOHN A. FISHER
BY
ATTORNEY

United States Patent Office 2,783,656
Patented Mar. 5, 1957

2,783,656

BALL DEFLECTOR FOR BALL SCREWS

John A. Fisher, Maple Heights, Ohio, assignor to The Cleveland Pneumatic Tool Company, Cleveland, Ohio, a corporation of Ohio Application December 19, 1955, Serial No. 553,785

5 Claims. (Cl. 74—459)

This invention relates generally to antifriction ball screw and nut devices and more particularly to a new and improved deflector which is used to deflect the balls into and out of the return tube as the screw and nut rotate relative to each other.

It is an important object of this invention to provide a deflector element for use within the nut of a ball screw device which is compressed by the groove of the nut so that it is retained within the groove by the reaction force of deflection in combination with an anchoring hook which is positioned within a recess in the wall of the nut which prevents the deflector element from moving along the groove.

Further objects and advantages will appear from the following description and drawings, wherein.

Figure 1:
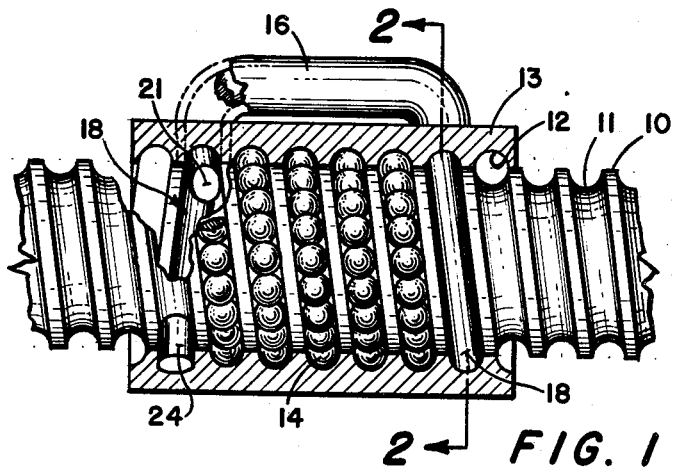
Figure 1 is a side elevation partially in longitudinal section showing a ball screw and nut incorporating deflector elements according to this invention.

Referring to the drawings, an antifriction ball screw and nut device incorporates a screw 10 formed with a helical groove 11 which cooperates with a helical groove 12 formed in a nut 13 to form a helical passage. A plurality of antifriction ball bearings 14 are positioned within the helical passage and interconnect the nut 13 and screw 10 in a manner wherein relative rotation between the nut and screw produces relative axial motion therebetween. When there is relative rotation between the nut 13 and screw 10, the balls roll along the surface of the grooves 11 and 12 and progress to one or the other of the ends of the nut. Therefore means must be provided to convey the balls 14 between the ends of the nut to produce a closed circuit. To that end, a return tube 16 is mounted on the nut 13 so that the ends of the return tube connect to opposite ends of the nut. The ends of the return tubes are positioned within the first bores 22 which are co-axial with second bores 23 that form a continuation of the return tube passage and connect the return tube with the helical passage.

Positioned within the groove 12 of the nut 13 adjacent to each end of the return tube 16 is a deflector element 18. The deflector elements are partly circular, preferably formed from resilient rod stock and propertioned so that when they are positioned within the groove 12 they are compressed from an unstressed condition. Therefore a resilient reaction force is produced which urges the deflector elements 18 into engagement with the surface of the groove 12 and assures a close and tight fit of the element within the groove. The deflector elements 18 are formed so that they have a circular portion 19 which extends along the surface of the groove 12 through more than 180°. One end of each deflector element is formed with an inclined deflecting surface 21 which engages the balls within the helical passage as they approach the end of the return tube 16 and deflect the balls from the helical passage into the return tube. It should be understood that both of the deflector elements are similar and that when one operates to deflect balls into the return tube, the other operates to deflect balls from the return tube into the helical passage.

The end of each deflector element opposite from the deflecting surface 21 is formed with a hook portion 24 extending radially outward and positioned within a recess or radial bore 26 formed in the nut 13. It should be understood that it is preferable to use a bore 26 which extends completely through the wall of the nut since it is the easiest form to manufacture. However, any recess which provides radially extending walls to be engaged by the hook portion 24 will serve the function of anchoring the deflector element 18 against motion along the surface of the groove 12.

Figure 2:
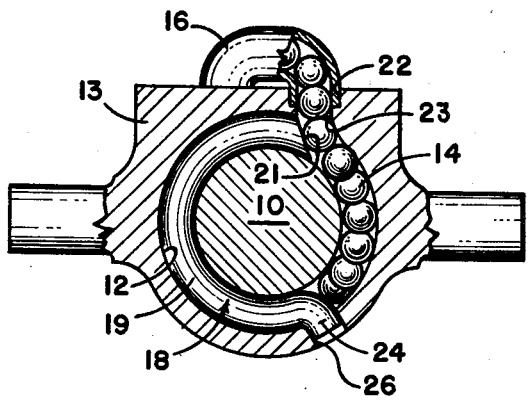
Figure 2 is a cross sectional view taken along 2—2 of Figure 1.

To assemble the deflector elements 18 within the nut, it is necessary to compress the deflector element so that it may be positioned within the groove with the hook portion 24 within the bore 26. As mentioned previously, the various proportions should be arranged so that once the deflector element is positioned as shown in Figure 2, the deflector elements will still be compressed by the walls of the groove 12. The spring action of the deflector element will also hold the hook portion 24 in radial bore 26. If it becomes necessary to remove the deflector element 18 from the nut, pressure can be applied to the hook portion 24 through the bore 26 to unhook the deflector after which it can be threaded out of the nut. Because the hook portion 24 positively prevents the deflector from sliding along the groove, the deflector does not have to be formed so that there is an excessive engagement pressure between the deflector element and the surface of the groove 12 to secure the deflector in place. Those skilled in the art will recognize that by the use of a deflector element according to this invention, an economical easily assembled mechanism may be manufactured.

Figure 3:
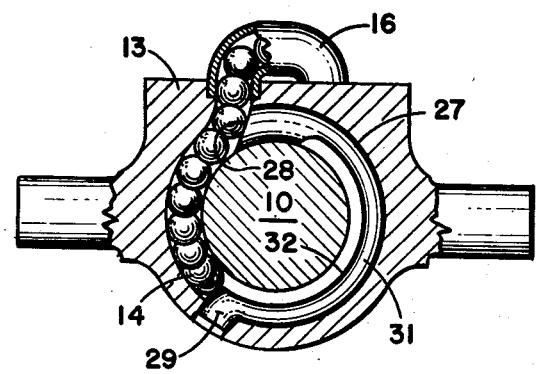
Figure 3 is a cross section of a nut incorporating a second embodiment of the deflector element according to this invention.

In Figure 3 another form of deflector element 27 is shown. In this case the deflector element is provided with a deflecting surface 28 and a hook portion 29 similar to the first embodiment. However, the circular portion 31 is cut away to form a relief 32 which reduces the rigidity of the deflector elements so that it may be more easily compressed for insertion within the nut. It should be recognized that although the preferred deflector element is formed of rod stock, stamping or other methods of manufacture may be used so long as the resulting deflector element operates in the manner taught by this invention.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a device of the character described a member formed with helical groove, means formed with a recirculating passage connecting the ends of said groove, and an arcuate resilient deflector element adjacent to each end of said recirculating passage providing a surface adapted to deflect antifriction members between said groove and recirculating passage, said elements engaging the wall of said groove through more than 180° thereby compressing said elements from their unstressed position whereby said elements are resiliently urged into engagement with the walls of said groove, said elements and member being formed with mutually engaging radially extending locking means which prevent movement of said elements along said groove.

2. In a device of the character described a nut formed with an internal helical groove, means formed with a recirculating passage connecting the ends of said groove, and an arcuate resilient deflector element adjacent to each end of said recirculating passage providing a surface adapted to deflect antifriction members between said groove and recirculating passage, said deflector elements engaging said groove through more than 180° with said engagement compressing said deflector elements from their unstressed position whereby they are resiliently urged into engagement with the walls of said groove, a radial aperture in the wall of said nut for each deflector, and a portion on each deflector element extending into one of said apertures thereby preventing movement of said deflector elements along said groove.

3. In a device of the character described a nut formed with an internal helical groove, means formed with a recirculating passage connecting the ends of said groove, and an arcuate resilient deflector element adjacent to each end of said recirculating passage providing an end surface adapted to deflect antifriction members between said groove and recirculating passage, said deflector elements engaging said groove through more than 180° with said engagement compressing said deflector elements from their unstressed position whereby they are resiliently urged into engagement with the walls of said groove, an aperture in the wall of said nut for each deflector and a hook portion on the end of said deflector elements opposite said end surface extending into one of said apertures thereby preventing movement of said deflector elements along said groove.

4. A ball screw comprising screw and nut each formed with a helical groove which mutually cooperate to define a helical passage, a plurality of antifriction members in said passage interconnecting said nut and screw whereby relative rotation between said nut and screw produces relative axial motion therebetween, a return tube on said nut connecting the ends of said passage forming a closed circuit of antifriction members, and a deflector element positioned in said nut groove adjacent to each end of said passage formed with a surface adapted to deflect said antifriction members between said passage and said return tube, each deflector element engaging said nut groove through more than 180° and being compressed thereby from its unstressed position, a recess in said nut for each deflector, said deflectors being formed with hook portions extending into said recesses preventing movement of said deflectors along said nut groove.

5. A ball screw comprising screw and nut each formed with a helical groove which mutually cooperate to define a helical passage, a plurality of antifriction members in said passage interconnecting said nut and screw whereby relative rotation between said nut and screw produces relative axial motion therebetween, a return tube on said nut connecting the ends of said passage forming a closed circuit of antifriction members, and a deflector element positioned in said nut groove adjacent to each end of said passage formed with a surface adapted to deflect said antifriction members between said passage and said return tube, each deflector element engaging said nut groove through more than 180° and being compressed thereby from its unstressed position, a portion of said deflector elements intermediate its ends being formed of reduced cross section to decrease the force necessary to compress it from the unstressed position, a recess in said nut for each deflector, said deflectors being formed with hook portions extending into said recesses preventing movement of said deflectors along said nut groove.

References Cited in the file of this patent

UNITED STATES PATENTS

| | | |
|---|---|---|
| 2,505,131 | Means | Apr. 25, 1950 |
| 2,636,397 | Jacubenta | Apr. 28, 1953 |